United States Patent
Kay

(10) Patent No.: US 7,455,211 B2
(45) Date of Patent: Nov. 25, 2008

(54) MULTI-PASS FRICTION STIR WELDING

(75) Inventor: Robert M. Kay, Wichita, KS (US)

(73) Assignee: The Boeing Company, Chicago, IL (US)

( * ) Notice: Subject to any disclaimer, the term of this patent is extended or adjusted under 35 U.S.C. 154(b) by 178 days.

(21) Appl. No.: 10/747,506

(22) Filed: Dec. 29, 2003

(65) Prior Publication Data

US 2005/0139640 A1 Jun. 30, 2005

(51) Int. Cl.
*B23K 20/12* (2006.01)
(52) U.S. Cl. .................................. 228/112.1
(58) Field of Classification Search ............ 228/2.1, 228/112.1
See application file for complete search history.

(56) References Cited

U.S. PATENT DOCUMENTS

| | | | |
|---|---|---|---|
| 5,248,077 A | | 9/1993 | Rhoades et al. |
| 5,460,317 A | * | 10/1995 | Thomas et al. ............ 228/112.1 |
| 5,813,592 A | | 9/1998 | Midling et al. |
| 6,247,633 B1 | | 6/2001 | White et al. |
| 6,634,199 B2 | * | 10/2003 | Nomura et al. ................ 72/75 |
| 2003/0116609 A1 | | 6/2003 | Dracup et al. |
| 2004/0074948 A1 | * | 4/2004 | Kusunoki et al. ......... 228/112.1 |
| 2005/0072832 A1 | * | 4/2005 | Han et al. ................ 228/112.1 |
| 2005/0133567 A1 | * | 6/2005 | Runyan .................... 228/112.1 |
| 2006/0013645 A1 | * | 1/2006 | Ilyushenko et al. ........... 403/270 |

FOREIGN PATENT DOCUMENTS

JP 2003-112271 A * 4/2003
JP 2003266181 A * 9/2003

OTHER PUBLICATIONS

W.Thomas et al., The Simultaneous Use of Two or More Friction Stir Welding Tools, Jan. 13, 2005 www.twi.co.uk, 6 pages.*
L. Cederqvist and A.P. Reynolds; *Factors Affecting the Properties of Friction Stir Welded Aluminum Lap Joints*; research development; 7 pages; Welding Journal, no date.
Murray Mahoney; *Rockwell Scientific: Structural Materials*; Sep. 29, 2003; 1 page; http://www.rsc.rockwell.com/structuralmaterials/index.html.
TWI World Centre for Materials Joining Technology; *Friction Stir Welding-Materials and thicknesses*; Sep. 29, 2003; 2 pages; http://www.twi.co.uk/j32k/unprotected/band_1/fswmat.html.

(Continued)

*Primary Examiner*—Kiley Stoner
(74) *Attorney, Agent, or Firm*—Alston & Bird LLP

(57) ABSTRACT

A multi-pass friction stir weld joint and method for forming such joints are provided. The multi-pass weld joint is formed of at least first-pass and second-pass friction stir weld joints that are disposed in the workpiece in a substantially parallel configuration. The first- and second-pass joints define transversely opposite advancing and retreating sides, and the second-pass joint is disposed to at least partially overlap the retreating side of the first-pass joint. Thus, at least some of the material of the workpiece in the first-pass joint is processed during the formation of the second-pass joint.

32 Claims, 8 Drawing Sheets

OTHER PUBLICATIONS

TWI World Centre for Materials Joining Technology; Stephan Kallee and Dave Nicholas; *Friction Stir Welding at TWI*; Sep. 29, 2003; 2 pages; http://www.twi.co.uk/j32k/unprotected/band_1/fswintro.html.

TWI World Centre for Materials Joining Technology; *Friction Stir Welding—Superior weld quality*; Sep. 29, 2003; 3 pages; http://www.twi.co/uk/j32k/unprotected/band_1/fswqual.html.

TWI World Centre for Materials Joining Technology; *Friction Stir Welding—Intellectual Property Rights*; Sep. 29, 2003; 2 pages; http://www.twi.co.uk/j32k/unprotected/band_1/fswipr.html.

TWI World Centre for Materials Joining Technology; *Re-stir™—reversal stir welding*; Oct. 17, 2003; 4 pages; http://www.twi.co.uk/j32k/unprotected/band_1/c1233.html.

* cited by examiner

MULTI-PASS FRICTION STIR WELDING

BACKGROUND OF THE INVENTION

1) Field of the Invention

The present invention relates to friction welding and, more specifically, to a method for overlapping friction stir weld joints to form multi-pass friction stir weld joints.

2) Description of Related Art

Friction stir welding is a process in which a rotating tool, such as a pin or probe, is urged into and/or through a workpiece, e.g., to join multiple members of the workpiece in a solid state or to repair cracks in a workpiece. Typically, the pin extends from a shoulder, which can be flat, concave, or otherwise contoured, and the shoulder is urged against the workpiece so that the pin is urged therein. The pin is then urged through the workpiece to form a continuous weld joint. For example, during one conventional friction stir welding process, a friction stir welding machine urges the probe of the rotating tool into an interface defined by two abutting workpiece members, and moves the tool along the interface. The motion of the rotating tool generates frictional heating, thereby forming a region of plasticized material in the workpiece. The tool can be tilted approximately 2.5° relative to the workpiece such that the trailing edge of the shoulder is thrust into and consolidates the plasticized material. Upon solidification of the plasticized material, the members of the workpiece are joined along the weld joint. Friction stir welding is further described in U.S. Pat. No. 5,460,317 to Thomas et al., the contents of which are incorporated herein by reference.

Friction stir weld joints are typically not uniform throughout due, at least in part, to the asymmetry of the conventional friction stir welding process. In particular, a conventional friction stir weld joint is characterized by transversely opposite advancing and retreating sides. As shown in FIG. 1, a friction stir weld pin 10 is rotated and advanced longitudinally through a workpiece 12, i.e., two overlapping structural members 20, 22, to form a friction stir weld lap joint 14. The pin 10 is rotated in a direction 26 and advanced longitudinally in a direction 28. The relative speed of the outer surface of the pin 10 with respect to the workpiece 12 is a function of the rotational speed of the pin 10 and the speed of the longitudinal advancement of the pin 10 through the workpiece 12. In particular, the speed of the pin 10 relative to the workpiece 12 at a first side 16, referred to as the advancing side, is generally equal to the sum of the speed of the longitudinal movement of the pin 10 and the product of the rotational, or angular, speed of the pin 10 and the radius of the pin 10. Similarly, the speed of the pin 10 relative to the workpiece 12 at the second side 18, referred to as the retreating side, is generally equal to the product of the rotational speed of the pin 10 and the radius of the pin 10 less the speed of the longitudinal movement of the pin 10. Thus, the relative speed is greater at the advancing, first side 16 of the joint 14, and slower at the retreating, second side of the joint 18.

The material of the workpiece 12 at the advancing side 16 of the joint 14 is typically displaced more and mixed more thoroughly than the material at the retreating side 18 of the joint 14. FIG. 2 illustrates a lap weld joint 14 formed between two anodized aluminum structural members 20, 22, with the friction stir welding pin 10 rotating at 625 revolutions per minute and advanced longitudinally at a speed of 7.5 inches per minute. FIGS. 3 and 4 illustrate portions at the advancing and retreating sides 16, 18, respectively, of the joint 14. The material at the advancing side 16 exhibits better dispersion as compared to the material at the retreating side 18. In particular, the interface 24 between the anodized surfaces of the structural members 20, 22 is still evident, albeit deformed, at the retreating side 18. In contrast, the material at the advancing side 16 is mixed so that the interface 24 no longer exists. The incomplete mixing of the material at the retreating side 18 of the joint 14 can reduce the strength of the joint 14, especially where the interface 24 of the structural members 20, 22 extends from the joint 14, as is the case in a friction stir welded lap joint.

Thus, conventional friction stir welding methods have been shown to form weld joints in which the material of the workpiece is plasticized and mixed, and the resulting granular structure in the weld joint is refined. However, a need continues to exist for an improved friction stir weld joint in which the material has been sufficiently mixed and refined throughout and for an improved method for forming such joints. Preferably, the method should be capable of forming a lap joint, in which the joint extends substantially perpendicular through the interface.

SUMMARY OF THE INVENTION

The present invention provides a multi-pass friction stir weld joint and a method for forming such joints in a workpiece. The multi-pass friction stir weld joint is formed of first-pass and second-pass friction stir weld joints that are at least partially disposed in the workpiece in a substantially parallel configuration. Each of the first- and second-pass joints defines transversely opposite advancing and retreating sides, and the second-pass friction stir weld joint at least partially overlaps the retreating side of the first-pass friction stir weld joint. Thus, material at the retreating side of the first-pass joint that may be insufficiently mixed during formation of the first-pass joint is re-mixed during the formation of the second-pass joint.

According to one embodiment of the present invention, the advancing sides of the first- and second-pass friction stir weld joints are disposed transversely opposite so that the retreating side of the second-pass friction stir weld joint at least partially overlaps the first-pass friction stir weld joint. Further, the retreating side of the second-pass friction stir weld joint can be disposed substantially entirely within the first-pass friction stir weld joint. The second-pass joint can overlap at least about two-thirds, or at least about nine-tenths, of a width of the first-pass joint.

According to one aspect of the invention, a third-pass friction stir weld joint is also disposed in the workpiece. The third-pass friction stir weld joint extends substantially parallel to the first-pass joint and at least partially overlaps the retreating side of the second-pass joint so that the three joints in combination form the multi-pass friction stir weld joint.

The workpiece can include at least two structural members defining an interface therebetween, and the first- and second-pass joints can extend through the interface to define a lap joint between the structural members. The workpiece can be formed of materials such as aluminum, aluminum alloys, titanium, titanium alloys, and steel.

The present invention also provides a method of friction stir welding a workpiece. The method includes rotating a friction stir welding pin and urging the friction stir welding pin in a first direction against the workpiece to plasticize a portion of the workpiece and form the first-pass joint therein. The same friction stir welding pin, or a different pin, is then rotated and urged against the workpiece to plasticize a portion of the workpiece and form the second-pass joint so that the second-pass joint at least partially overlaps the retreating side of the first-pass joint. For example, the first- and second-pass joints can be formed by urging the friction stir welding pin in the same direction and rotating the pin in opposite rotational directions. Alternatively, the joints can be formed by urging the pin in opposite directions and rotating the pin in the same direction. First and second pins can be used for forming the respective first- and second-pass joints, and the pins can have dissimilar contours on their outer surfaces, e.g., to define opposite orientations that can be rotated in opposite directions.

The overlap portion of the first- and second-pass joints can vary, and can be determined according to a desired width of the resulting multi-pass joint and a width of each of the first- and second-pass joints. Further, a third-pass joint can at least partially overlap the retreating side of the second-pass joint.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
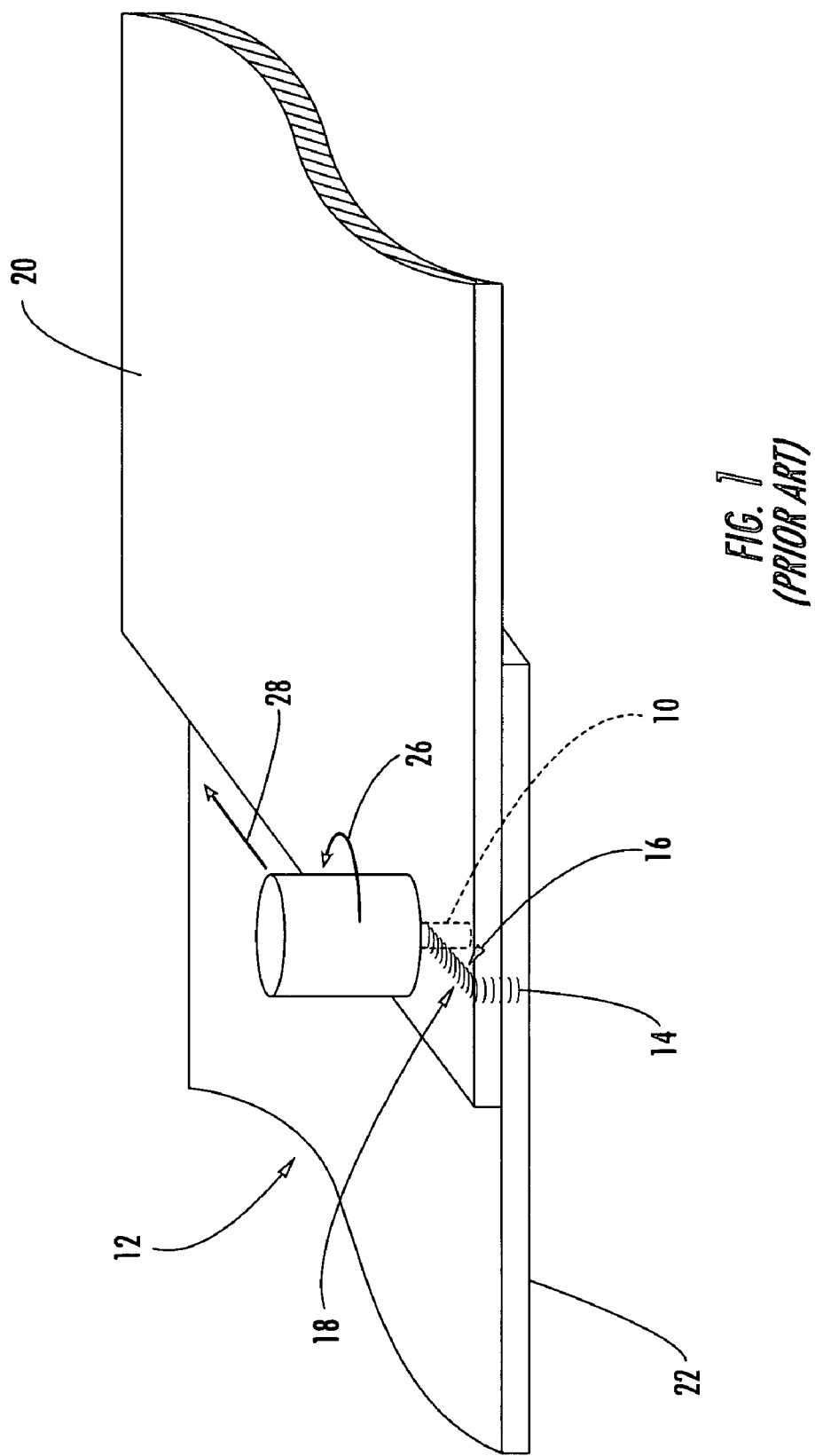
FIG. 1 is a perspective view illustrating a conventional friction stir welding tool used for forming a friction stir weld lap joint between two structural members.
Figure 2:
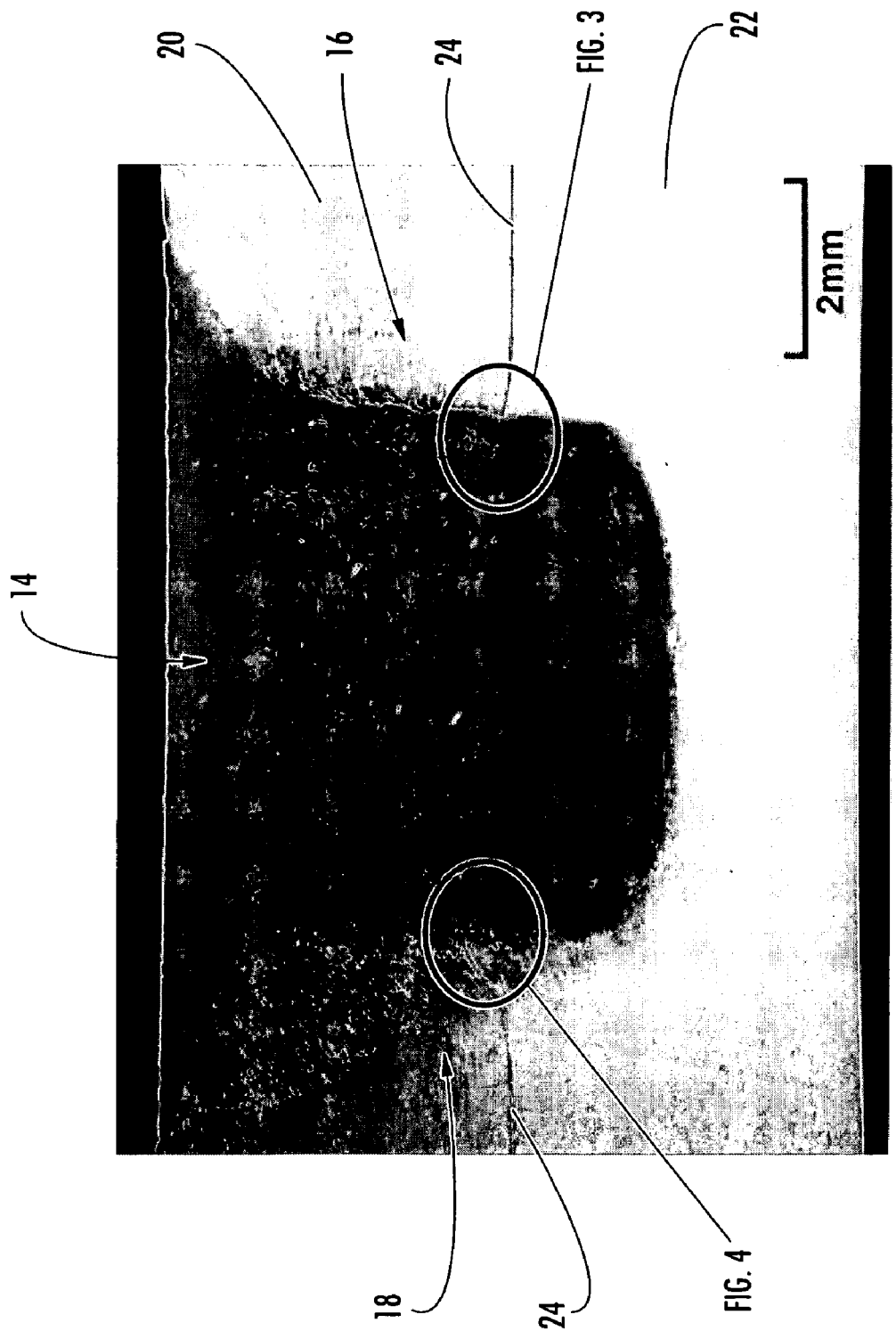
FIG. 2 is a section view of a conventional friction stir weld lap joint.
Figure 3:
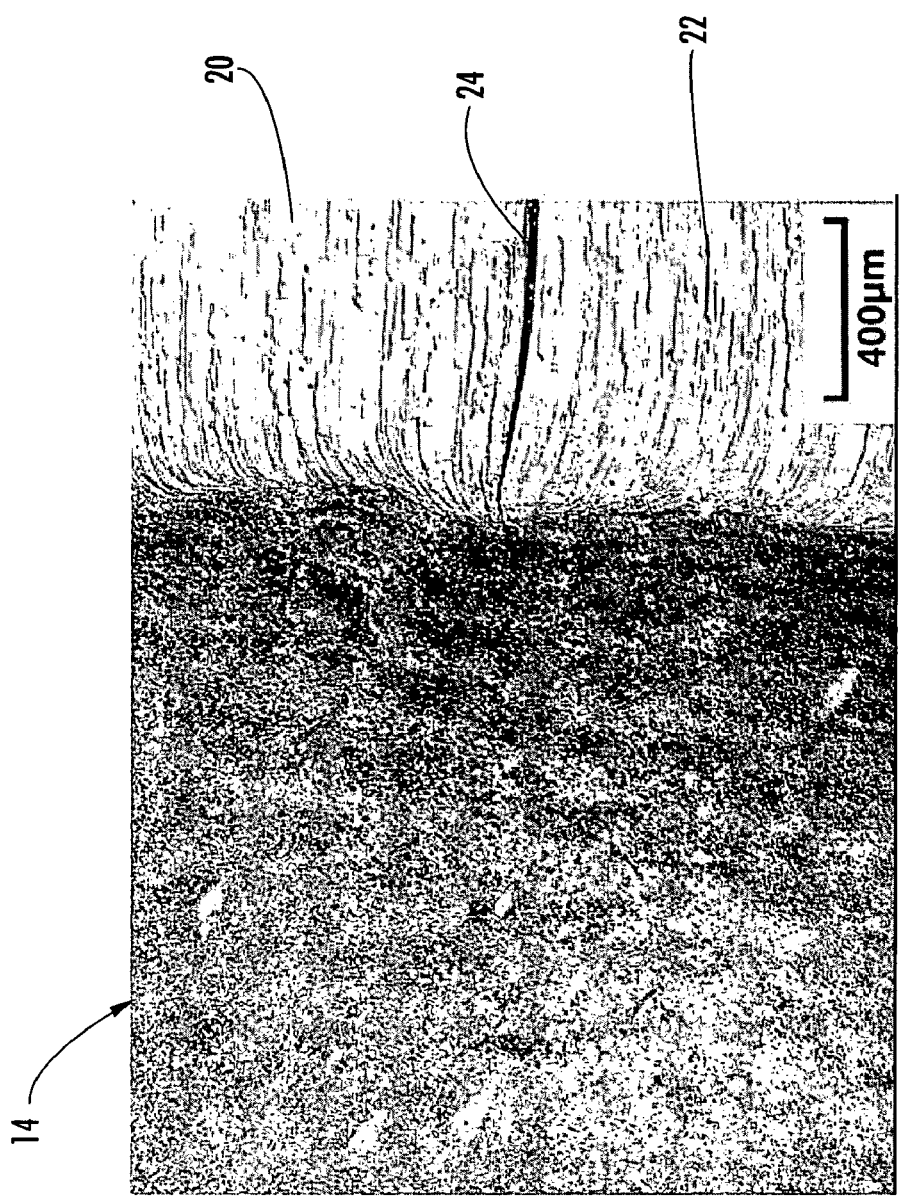
FIG. 3 is a partial section view of the conventional friction stir weld joint of FIG. 2, showing a portion of the joint at the advancing side of the joint as indicated in FIG. 2.
Figure 4:
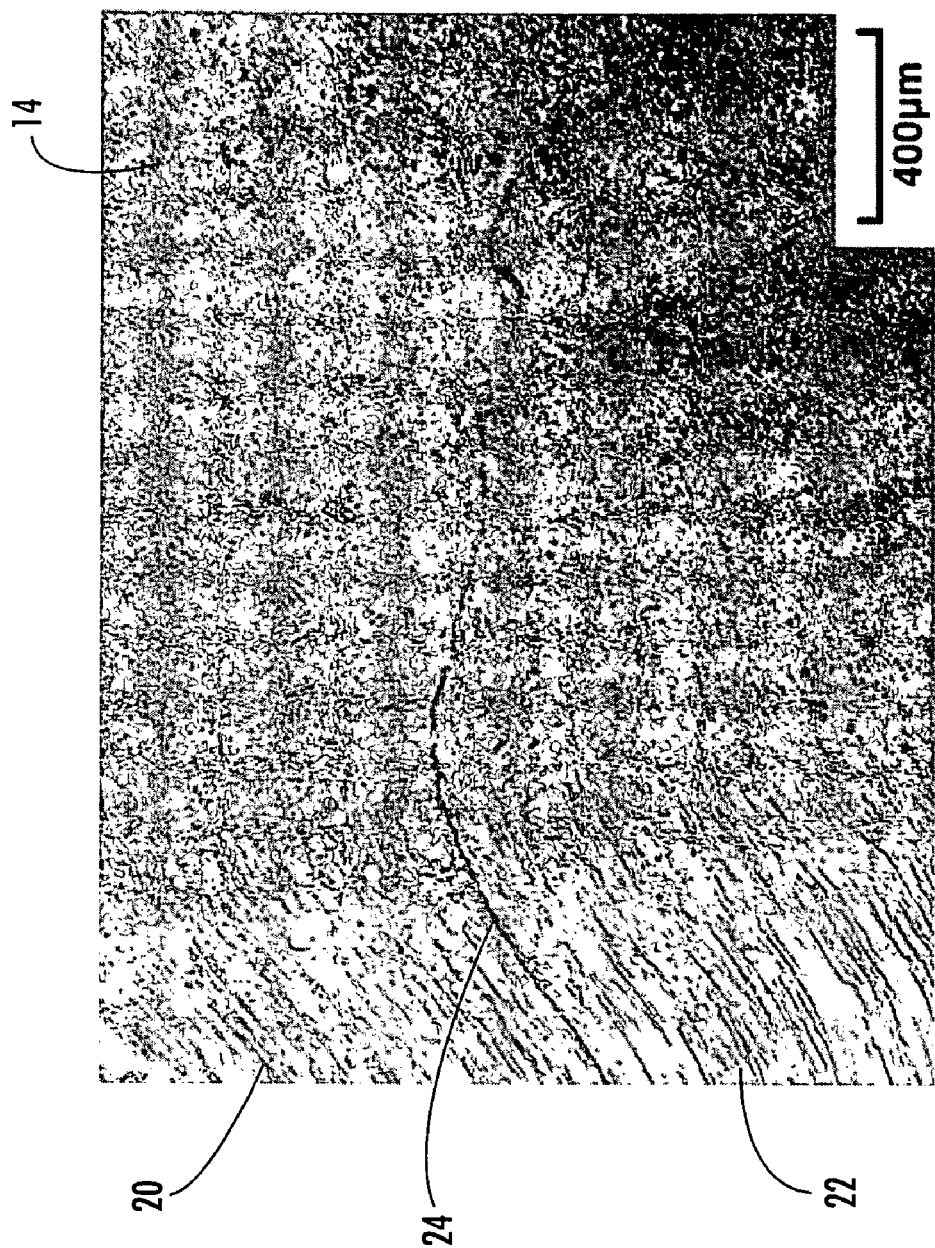
FIG. 4 is a partial section view of the conventional friction stir weld joint of FIG. 2, showing a portion of the joint at the retreating side of the joint as indicated in FIG. 2.
Figure 5:
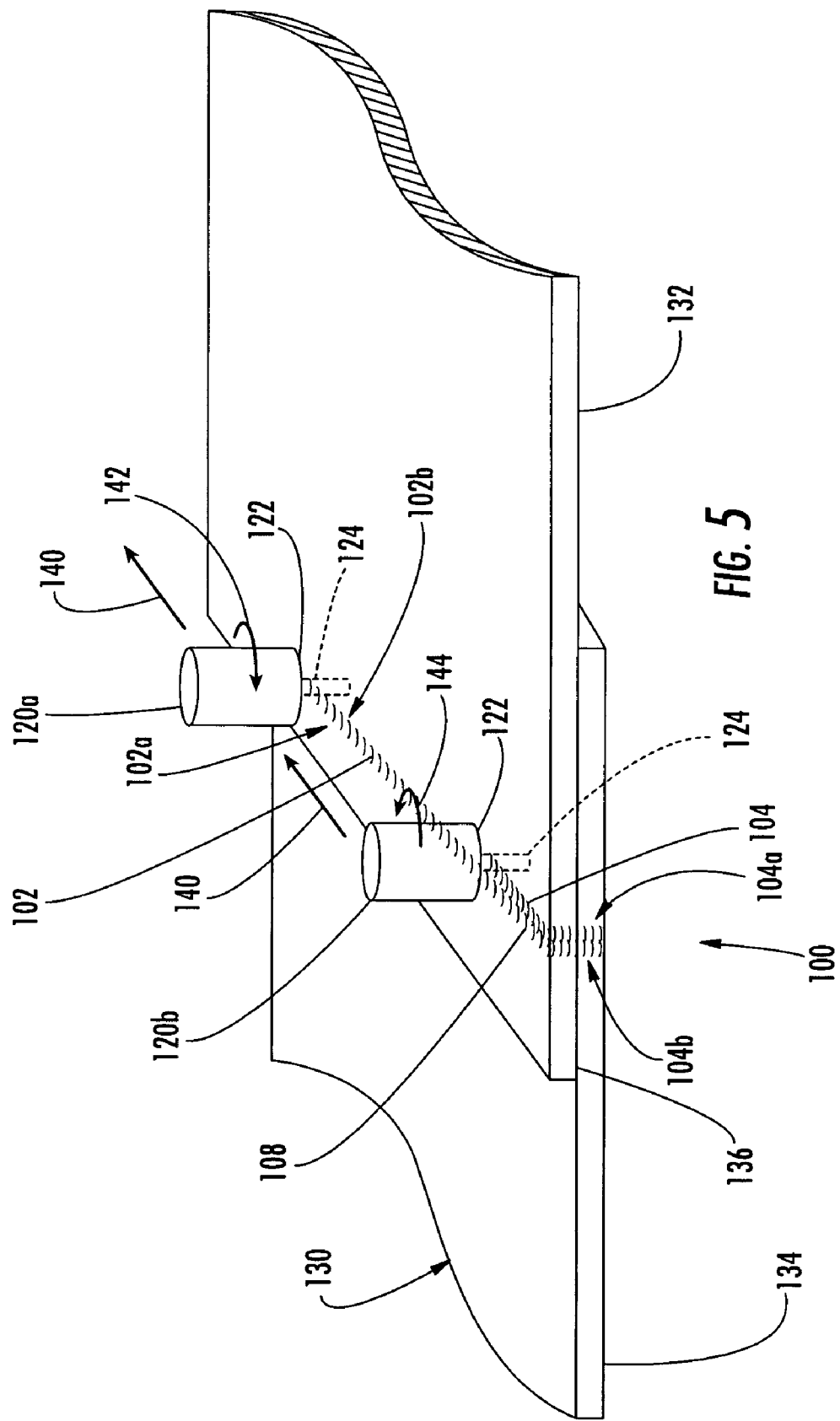
FIG. 5 is a perspective view illustrating a multi-pass friction stir weld joint during formation according to one embodiment of the present invention.

Referring now to the drawings and, in particular, to FIG. 5, there is shown a multi-pass friction stir weld joint 100 in a workpiece 130 during formation according to one embodiment of the present invention. The multi-pass joint 100 is formed of first-pass and second-pass friction stir weld joints 102, 104, which at least partially overlap.

The first- and second-pass friction stir weld joints 102, 104 can be formed using friction stir welding tools 120a, 120b, each of which includes a rotatable shoulder 122, a pin 124 extending therefrom, and at least one actuator (not shown) for rotating the respective tool 120a, 120b and moving the tool 120a, 120b longitudinally through the workpiece 130. The shoulder 122 and pin 124 of each tool 120a, 120b can be engaged to a chuck, spindle, or other member that is engaged to the actuator, which can be any of various types of actuating devices, including electric, hydraulic, or pneumatic devices. For example, the actuator can be part of a machine, such as a milling machine or a drill, that is structured for rotating and moving the friction stir welding tool 120a, 120b. The actuator be operated manually, but preferably is operated by a computer, microprocessor, microcontroller or other controller, which can be programmed to operate according to a schedule such as a schedule stored in or created by a computer software program.

The pin 124 and shoulder 122 are preferably formed of a material having high strength and heat resistance. For purposes of example only and not limitation, the pin 124 and/or shoulder 122 can be constructed of tool steel, a molybdenum alloy, such as TZM, nickel alloys, such as Rene 41 (UNS N07041), and iron-nickel alloys. The shoulder 122 is structured to be urged against the workpiece 130 so that the pin 124 is inserted into the workpiece 130, e.g., into a lap interface 136 as shown in FIG. 5. In other embodiments of the invention, the tool 120a, 120b can include a second shoulder that is structured to oppose the first shoulder 122 with the pin 124 extending therebetween so that the shoulders can be disposed opposite the workpiece 130 and frictionally engaged to opposite surfaces of the workpiece 130 while the pin 124 extends through the workpiece 130. In either case, each shoulder 122 of the tools 120a, 120b can define a surface that is generally flat, tapered, concave, convex, or otherwise shaped, e.g., to engage the workpiece 130 and prevent "plowing," in which plasticized material from the workpiece 130 is pushed radially outside the circumference of the shoulder 122 as the tool 120a, 120b is moved along the workpiece 130. Further, each shoulder 122 can define one or more frictional features, e.g., raised portions or surfaces such as threads, bumps, or ribs that are structured to frictionally engage the workpiece 130. For example, a spiral thread can be provided on the shoulder 122 to engage the workpiece 130. The pin 124 defines a stirring portion that engages the workpiece 130 during welding, and the stirring portion of the pin 124 can be cylindrical or can define a variety of shapes and contours including helical threads, circumferential grooves, ridges, tapers, steps, and the like.

The urging force of the shoulder 122 against the workpiece 130 can be opposed by an anvil or other support device (not shown) positioned opposite the shoulder 122 or by a second shoulder connected to the pin 124 and positioned opposite the workpiece 130. Thus, the workpiece 130 can be "sandwiched" between the shoulder 122 and the additional shoulder or support device during friction stir welding. Advantageously, the shoulder 122 and the second shoulder or other support device can create a seal that prevents the plasticized material from being extruded therefrom. Thus, planar or otherwise desired contours can be formed on the opposing sides of the workpiece 130 at the weld joint 100. The rotating friction stir welding tool 120a, 120b can be moved through the workpiece 130 along a predetermined path to thereby form the elongate weld joints 102, 104. Thus, the material of the workpiece 130 can be mixed by the pin 124, and the grain size of the material can be refined, thereby improving the material properties of the material at the joint 100.

Two friction stir welding tools 120a, 120b are illustrated in FIG. 5 for purposes of illustrative clarity, but the first- and second-pass friction stir weld joints 102, 104 can alternatively be formed using a single friction stir weld tool 120a, 120b that is moved longitudinally through the workpiece 130 in successive passes. Thus, the term "pass" refers to the motion of the friction stir weld tool 120a, 120b through the workpiece 130, and successive passes can be performed by a single tool 120a, 120b at different times or by different tools 120a, 120b at the same or different times. Each pass, while defining a generally longitudinal direction, need not be linear. In fact, the joints 102, 104 and, hence, the multi-pass joint 100, can be formed in any desired configuration in the workpiece 130. In addition, the joints 102, 104 can extend from an edge of the workpiece 130, i.e., by configuring the tool 120a, 120b at an edge of the workpiece 130, rotating the pin 124, and urging the tool 120a, 120b against and through the workpiece 130. Thus, the shoulder 122 contacts the surface of the workpiece 130, thereby constraining the axial movement of the plasticized material of the workpiece 130, and the pin 122 plasticizes and mixes the material of the workpiece 130. Alternatively, each weld joint 102, 104 can begin or end at a point inward from the edge of the workpiece 130, e.g., by urging, or "plunging," the pin 124 into the workpiece 130 at the start of the weld joint 102, 104 and/or subsequently retracting the pin 124 therefrom after welding.

Further, the tools 120a, 120b used during the multiple passes can be the same or different. For example, some conventional friction stir welding tools have pins 124 that define features such as helical threads that are structured to be rotated in a particular direction. Rotation of such pins 124 in the opposite direction can be ineffective for friction stir welding. Thus, if successive passes of a multi-pass friction stir weld joint 100 are to be performed by rotating the tools 120a, 120b in opposite directions, different pins 124 can be provided for the successive passes. The pins 124 and/or shoulders 122 of the tools 120a, 120b can be similar except for a reverse orientation of the features. Alternatively, the pins 124 and/or shoulders 122 can differ in other respects, e.g., diametrical size, length, number or configuration of features, and the like.

The term "workpiece" is not meant to be limiting, and it is understood that the workpiece 130 can include one or more structural members 132, 134, which can be configured in various configurations. Preferably, at least two structural members 132, 134 are positioned in an overlapping configuration to define the interface 136 therebetween that can be welded to form the joint 100, i.e., a lap weld joint formed by configuring the pin 124 to extend through the interface 136 as shown in FIG. 5. Alternatively, other types of joints can similarly be formed. For example, a butt joint can be formed by abutting the edge surfaces of the structural members 132, 134 and welding through an interface 136 of the abutting surfaces with the pin 124 substantially parallel to the interface 136. The structural members 132, 134 can also be positioned and welded in other configurations, and any number of structural members 132, 134 can be joined by the joint 100. In another embodiment, the workpiece 130 can include a single structural member and the friction stir weld joint can be formed in the single member, e.g., to join overlapping portions of the member, to repair a crack, hole, or other defect therein, or to affect the material properties of the structural member.

The structural members 132, 134 can be formed of a variety of materials including, but not limited to, aluminum, aluminum alloys, titanium, titanium alloys, steel, and the like. Non-metal materials can also be welded according to the present invention, e.g., materials such as polymers and the like. Further, the workpiece 130 can include members of similar or dissimilar materials, for example, structural members formed of different metals, including metals that are unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding permits workpieces formed of unweldable materials to be securely joined. Friction stir welding also can be used to securely join weldable materials to other weldable and to unweldable materials. Thus, the materials that form the workpiece 130 can be chosen from a wider variety of light weight, high strength metals and alloys, thereby facilitating reduction of the overall weight of the workpiece 130 and a structural assembly formed therefrom.

The workpiece 130 formed according to the methods of the present invention can be used in a variety of applications, including, for example, frames, panels, skins, airfoils, and the like for aeronautical and aerospace structures such as aircraft and spacecraft, for marine vehicles, automobiles, and the like, as well as for other applications outside of the transportation industry. The friction stir weld joints 100 can be used for joining large workpieces and workpieces having curvilinear geometries. In some applications, the members 132, 134 are joined in geometrical configurations that make difficult, or prevent, access to the opposing sides of the workpiece 130. For example, the structural members 132, 134 can be joined to form a partially or fully closed body such as a tube or an airplane wing.

Each of the first- and second-pass weld joints 102, 104 defines first and second transversely opposite sides and, more particularly, advancing sides 102a, 104a and retreating sides 102b, 104b. The advancing side 102a, 104a of each joint 102, 104 is characterized during forming by a generally greater speed of the outer surface of the pin 124 and the shoulder 122 relative to the workpiece 130 than the relative speed of the outer surface of the pin 124 and the shoulder 122 at the transversely opposite retreating side 102b, 104b. That is, as the tool 120a, 120b is rotated and the pin 124 is moved longitudinally through the workpiece 130, the relative speed of the outer surface of the pin 124 and the shoulder 122 with respect to the workpiece 130 is a function of the rotational speed of the tool 120a, 120b and the speed of the longitudinal advancement of the tool 120a, 120b through the workpiece 130. The difference in relative speeds at the advancing and retreating sides 102a, 104a, 102b, 104b is typically determined by the direction of rotation of the tool 120a, 120b and the direction of longitudinal movement of the tool 120a, 120b through the workpiece 130. Thus, the speed of the pin 124 relative to the workpiece 130 at the advancing side 102a, 104a is generally equal to the sum of the speed of the longitudinal movement of the pin 124 and the product of the rotational, or angular, speed of the pin 124 and the radius of the pin 124. Similarly, the speed of the pin 124 relative to the workpiece 130 at the retreating side 102b, 104b is generally equal to the product of the rotational speed of the pin 124 and the radius of the pin 124 less the speed of the longitudinal movement of the pin 124. Thus, the relative speed is greater at the advancing side 102a, 104a of the joint 100 and slower at the retreating side 102b, 104b of each joint 100.

As shown in FIG. 5, the second-pass friction stir weld joint 104 is formed substantially parallel to and at least partially overlapping the first-pass friction stir weld joint 102. While the entire second-pass friction stir weld joint 104 is shown to be substantially parallel to the first-pass friction stir weld joint 102, it is appreciated that the second-pass friction stir weld joint 104 can alternatively be only partially substantially parallel thereto. That is, a portion of the second-pass friction stir weld joint 104 can be substantially parallel to the first-pass friction stir weld joint 102, and other portion(s) of the second-pass friction stir weld joint 104 can be non-parallel to the first-pass friction stir weld joint 102. Preferably, the second-pass friction stir weld joint 104 overlaps the retreating side 102b of the first-pass friction stir weld joint 102 so that the material at the retreating side 102b of the first-pass friction stir weld joint 102 is mixed again during formation of the second-pass friction stir weld joint 104. Thus, if the material at the retreating side 102b of the first-pass friction stir weld joint 102 is not sufficiently mixed during the first pass, the second-pass of the friction stir weld tool 120b for forming the second-pass friction stir weld joint 104 can enhance the mixing of the material. By enhancing the mixing of the material of the workpiece 130, a sufficient amount of dispersion can be achieved throughout the joint 100, such that the joint 100 is free of weak portions and generally exhibits a sufficiently refined granular structure throughout.

Figure 6:
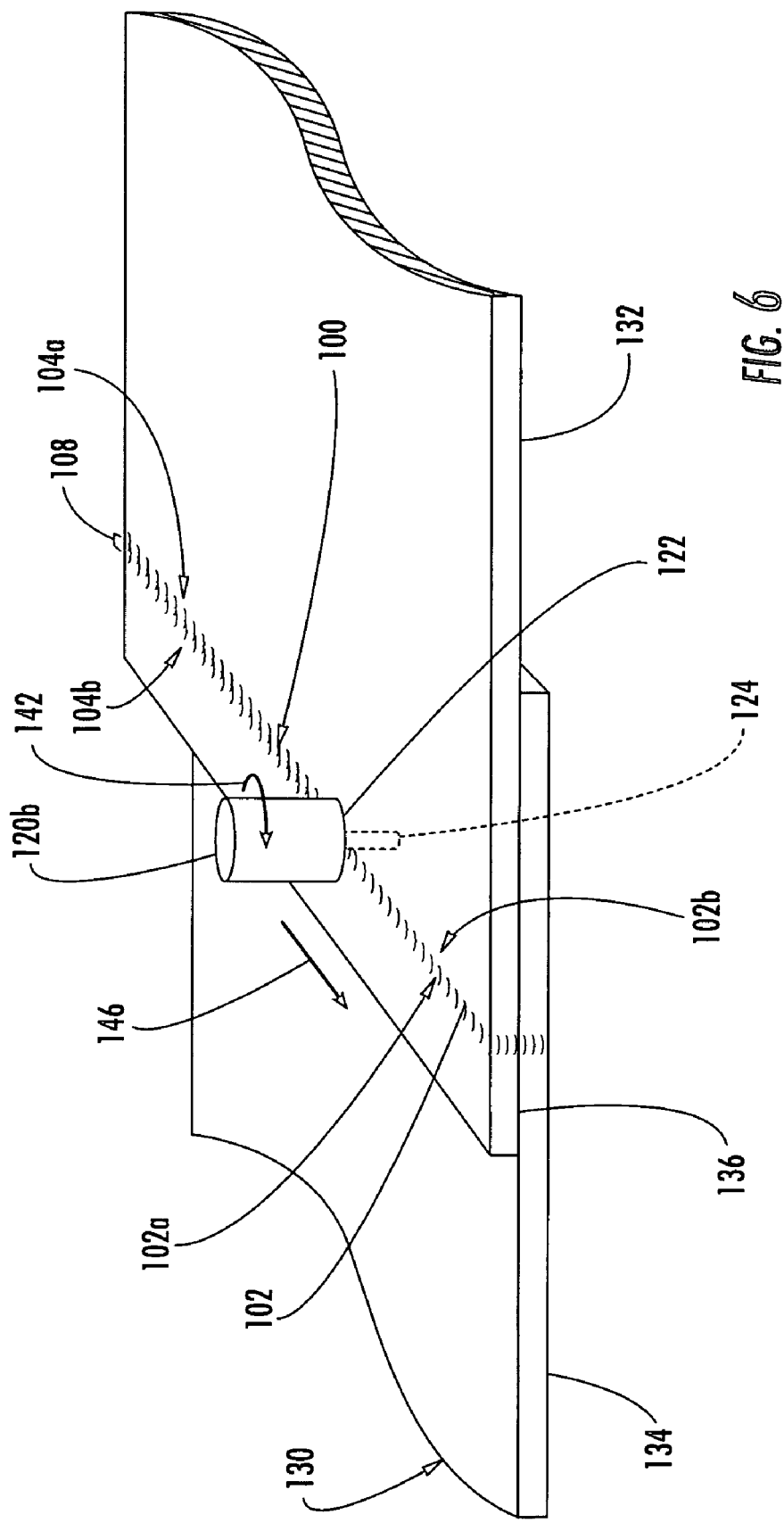
FIG. 6 is a perspective view illustrating a multi-pass friction stir weld joint during formation according to another embodiment of the present invention.

The second-pass friction stir weld joint 104 can be formed such that the retreating side 104b thereof is disposed at least partially overlapping the first-pass friction stir weld joint 102. Thus, the friction stir weld joints 102, 104 can be formed with the advancing sides 102a, 104a transversely opposite and the retreating sides 102b, 104b overlapped. For example, as shown in FIG. 5, the first-pass friction stir weld joint 102 can be formed by urging and moving the friction stir welding pin 124 of the first tool 120a in a first direction 140 and rotating the pin 124 in a first rotational direction 142. Subsequently, the second-pass friction stir weld joint 104 can be formed by urging and moving the pin 124 of the second tool 120b in the same direction 140, while rotating the pin 124 in an opposite direction 144. Alternatively, as shown in FIG. 6, the first-pass friction stir weld joint 102 can be formed as described above, and the second-pass friction stir weld joint 104 can be formed by urging and moving the pin 124 of the second tool 120b in an opposite direction 146, while rotating the pin 124 in the same direction 142 as the direction of rotation while forming the first-pass friction stir weld joint 102. In either case, the retreating side 102b of the first-pass friction stir weld joint 102 can be substantially overlapped by the second-pass friction stir weld joint 104, and the retreating side 104b of the second-pass friction stir weld joint 104 can be disposed substantially entirely within the first-pass friction stir weld joint 102.

The amount of overlap of the two friction stir weld joints 102, 104 can vary according to such factors as the amount of mixing achieved throughout the width of each joint 102, 104 during each friction stir welding operation, the desired amount of total mixing throughout the width of the multi-pass joint 100, the positional accuracy of the welding device, and the like. For example, the overlap of the two friction stir weld joints 102, 104 can be increased to compensate for a reduced amount of mixing of the individual single-pass joints 102, 104, and/or the overlap can be increased to achieve an increased amount of total mixing throughout the width of the multi-pass joint 100. In addition, an overlapped portion 108 of the first weld joint 102 can be maintained at a maximum, e.g., about nine-tenths of the width of the first weld joint 102, to ensure that the retreating side 104b of the second-pass friction stir weld joint 104 does not extend outward from the advancing side 102a of the first-pass friction stir weld joint 102, and thereby possibly introduce areas of insufficient mixing outside the area of the first-pass friction stir weld joint 102. For one typical single-pass friction stir weld joint, about one-third of the joint closest to the advancing side is generally sufficiently mixed, about one-third of the joint closest to the retreating side is generally insufficiently mixed, and the area therebetween may be sufficiently mixed. Thus, according to one embodiment of the present invention, the second-pass friction stir weld joint 104 is disposed to overlap at least about two-thirds of the width of the first-pass friction stir weld joint 102. In addition, the width of the overlap portion 108, i.e., the amount of overlapping of the two joints 102, 104, can be determined according to the desired width of the finished multi-pass friction stir weld joint 100. For example, the width of the overlap 108 can be equal to about the sum of the respective widths of the two joints 102, 104, less the desired width of the multi-pass joint 100.

It is also appreciated that the multi-pass friction stir weld joint 100 can be formed of any number of single-pass joints 102, 104. Thus, the multi-pass joint 100 can define any desired width. Advantageously, each single pass joint 102, 104 can be narrower than the width of the multi-pass joint 100 and, therefore, can be formed using a pin 124 and/or shoulder 122 having a diameter smaller than that which would be required to form a weld joint of equal width in a single pass. Further, the forging and lateral forces required for moving a narrow pin through a workpiece (and for moving a narrow shoulder in contact with the workpiece) is generally less than that required for moving a wider pin (and a wider shoulder). Therefore, the single-pass joints 102, 104 can be formed with less force than otherwise required to form a friction stir weld joint of similar width to the multi-pass joint 100, and the single-pass joints 102, 104 can be formed more quickly and/or with an actuator or machine having a reduced capacity to urge the pin 124 through the workpiece 130 with the shoulder 122 in contact with the workpiece 130.

Figure 7:
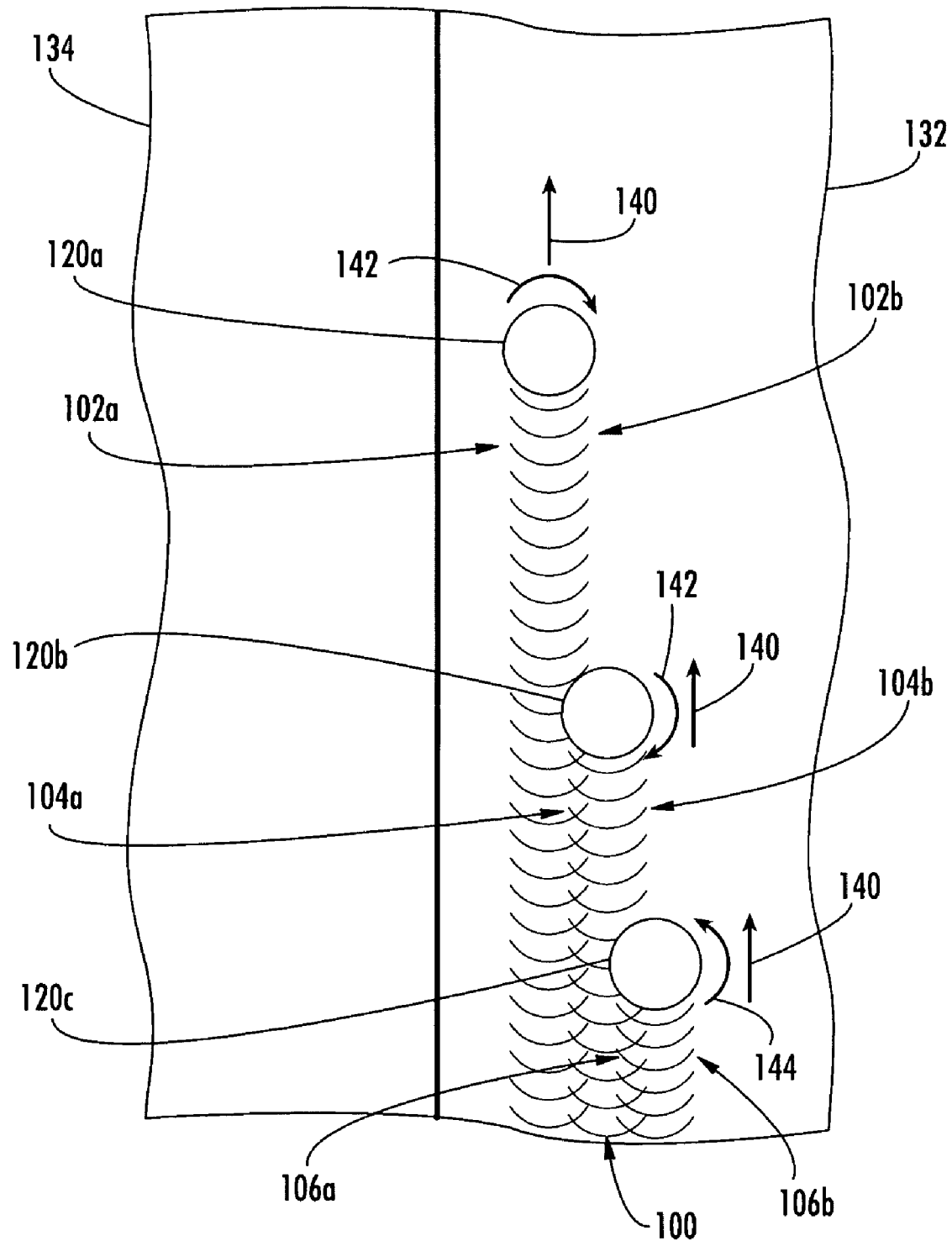
FIG. 7 is a plan view illustrating a multi-pass friction stir weld joint during formation according to yet another embodiment of the present invention.

For example, as illustrated in FIG. 7, the multi-pass friction stir weld joint 100 includes first-, second-, and third-pass friction stir weld joints 102, 104, 106. Preferably, the retreating side 102b of the first-pass joint 102 is at least partially overlapped by the second-pass or third-pass joints 104, 106. Further, the retreating side 104b of the second-pass joint 104 can be overlapped by the third-pass joint 106, and a retreating side 106b of the third-pass joint 106 can be disposed within one of the first- and second-pass joints 102, 104 so that the material at the retreating sides 102b, 104b, 106b of each of the joints 102, 104, 106 is mixed at least twice during the formation of the multi-pass joint 100. For example, as illustrated in FIG. 7, the first- and second-pass joints 102, 104 can be formed by rotating the friction stir welding tools 120a, 120b in the same rotational direction 142 and urging the tools 120a, 120b in the same longitudinal direction 140, such that the advancing side 104a of the second-pass joint 104 at least partially overlaps the retreating side 102b of the first-pass joint 102. The third-pass joint 106 can then be formed by rotating a friction stir welding tool 120c in the opposite direction 144 and urging the tool 120c in the same longitudinal direction 140, such that the retreating side 106b of the third-pass joint 106 at least partially overlaps the retreating side 104b of the second-pass joint 104. Alternatively, the third-pass joint 106 could be formed by rotating the friction stir welding tool 120c in the same direction and urging the tool 120c in a direction opposite to the direction 140 of the first and second passes so that the retreating side 106b of the third-pass joint 106 at least partially overlaps the retreating side 104b of the second-pass joint 104.

Further, according to other embodiments of the present invention, the retreating and advancing sides of single-pass joints can define transversely opposite sides of the joint 100. For example, as shown in FIG. 7, the advancing side 102a of the first-pass joint 102 is disposed transversely opposite to the retreating side 104b of the second-pass joint 104. The first- and second-pass joints 102, 104 can form a connection between the structural members 132, 134 without the third-pass joint 106. Additional single-pass joints can also be formed between the structural members 132, 134, with each successive single-pass joint having the same orientation as the first- and second-pass joints 102, 104 such that the resulting multi-pass joint 100 defines transversely opposite retreating and advancing sides.

Figure 8:
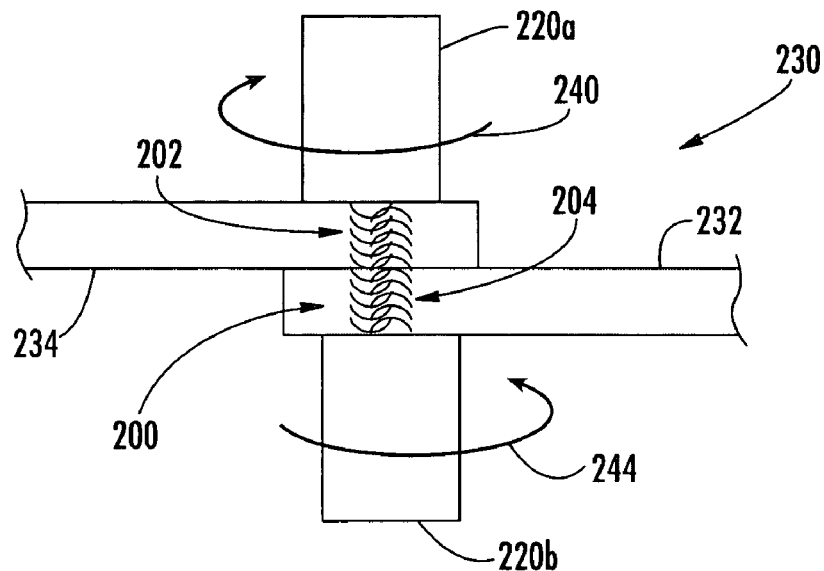
FIG. 8 is an elevation view illustrating a multi-pass friction stir welding joint during formation according to a still another embodiment of the present invention.
Figure 9:
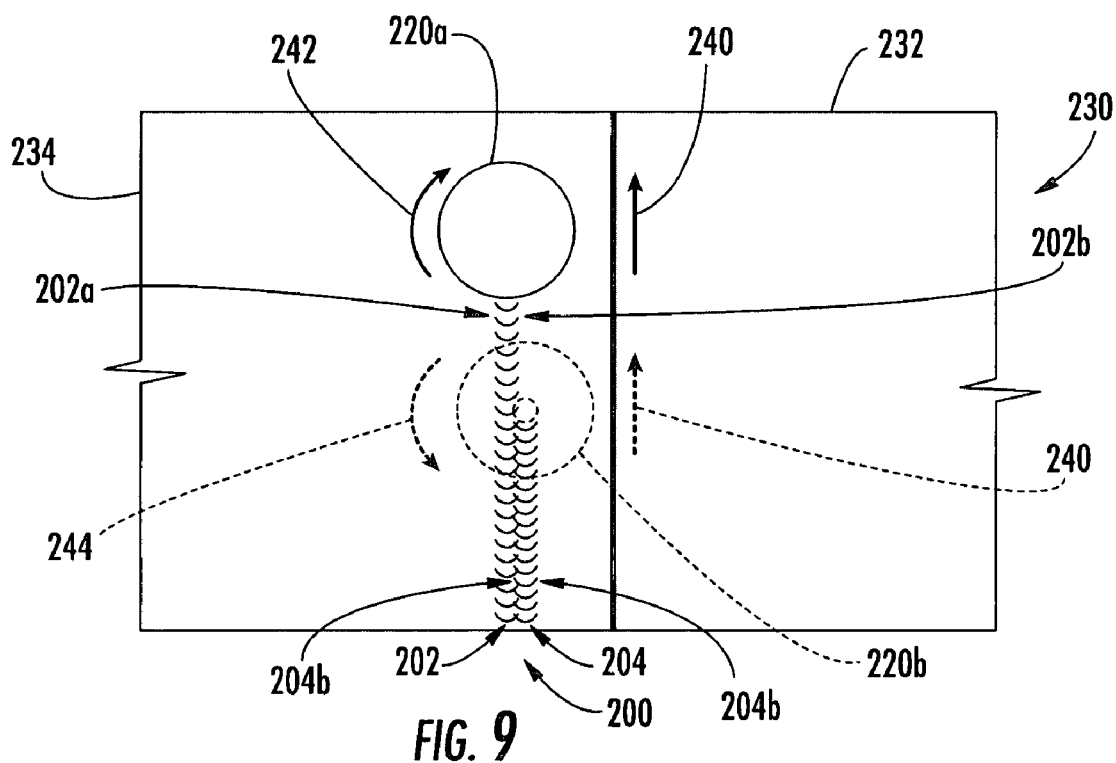
FIG. 9 is a plan view illustrating the multi-pass friction stir welding joint of FIG. 8.

It is also appreciated that each pass of the friction stir weld joints can be formed from either side of the workpiece. For example, FIGS. 8 and 9 illustrate a multi-pass friction stir weld joint 200 connecting first and second structural members 232, 234 of a workpiece 230. The multi-pass weld joint 200 includes first- and second-pass friction stir weld joints 202, 204. First and second friction stir welding tools 220a, 220b, each of which can be similar to the tools described above, are configured to form the joints 202, 204 from opposite sides of the workpiece 230. In particular, the first friction stir welding tool 220a is configured to be rotated in a first rotational direction 242 and urged in a longitudinal direction 240 of the joint 200. Thus, the first-pass friction stir weld joint 202 has transverse advancing and retreating sides 202a, 202b, as shown. The second friction stir welding tool 220b is configured to be rotated in a second rotational direction 244 and urged in the longitudinal direction 240 of the joint 200. Thus, the second-pass friction stir weld joint 204 has transverse advancing and retreating sides 204a, 204b, as shown. The second-pass friction stir weld joint 204 is substantially parallel to the first-friction stir weld joint 202 and partially overlaps the first-pass friction stir weld joint 202. Although two friction stir weld tools 220a, 220b are shown in FIGS. 8 and 9, it is understood that the different single pass joints 202, 204 of the friction weld joint 200 can be formed using a single tool. Further, any number of passes can be overlapped to form the multi-pass friction stir welding joint 200, and the single pass joints can be disposed in any order.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of friction stir welding a workpiece, the method comprising:

rotating a friction stir welding pin in a first rotational direction and urging the friction stir welding pin in a first direction against the workpiece to thereby plasticize a portion of the workpiece and form a first-pass friction stir weld joint therein defining an advancing side and a retreating side; and rotating the friction stir welding pin in a second rotational direction opposite the first rotational direction and urging the friction stir welding pin in the first direction against the workpiece to thereby plasticize a portion of the workpiece and form a second-pass friction stir weld joint therein at least partially substantially parallel to the first-pass friction stir weld joint, the second-pass friction stir weld joint defining an advancing side and a retreating side, wherein the second-pass friction stir weld joint only partially overlaps the first-pass friction stir weld joint, the second-pass friction stir weld joint at least partially overlapping the retreating side of the first-pass friction stir weld joint without entirely overlapping the advancing side of the first-pass friction stir weld joint such that the first-pass and second-pass friction stir weld joints form a multi-pass friction stir weld joint, wherein a portion of the second-pass friction stir weld joint is outside the first-pass friction stir weld joint.

2. A method according to claim 1 wherein said second rotating step comprises disposing the retreating side of the second-pass friction stir weld joint substantially entirely within the first-pass friction stir weld joint.

3. A method according to claim 1 further comprising rotating the friction stir welding pin and urging the friction stir welding pin against the workpiece to thereby plasticize a portion of the workpiece and form a third-pass friction stir weld joint therein, the third-pass friction stir weld joint being substantially parallel to the first-pass friction stir weld joint and defining an advancing side and a retreating side, and the third-pass friction stir weld joint at least partially overlapping the retreating side of the second-pass friction stir weld joint such that the first-pass, second-pass, and third-pass friction stir weld joints form the multi-pass friction stir weld joint.

4. A method according to claim 1 wherein said second rotating step comprises overlapping an overlap portion of the first-pass friction stir weld joint with the second-pass friction stir weld joint, the first-pass friction stir weld joint defining a width in a transverse direction extending between the advancing and retreating sides and the overlap portion of the first-pass friction stir weld joint being at least about two-thirds the width of the first-pass friction stir weld joint.

5. A method according to claim 4 wherein said second rotating step comprises overlapping at least about nine-tenths of the width of the first-pass friction stir weld joint.

6. A method according to claim 1 further comprising determining a width of an overlap portion of the of the first-pass friction stir weld joint according to a desired width of the multi-pass friction stir weld joint and a width of the first-pass and second-pass friction stir weld joints and wherein said second rotating step comprises overlapping the overlap portion of the first pass friction stir weld joint with the second-pass friction stir weld joint.

7. A method according to claim 1 further comprising positioning at least two structural members to form the workpiece defining an interface between the structural members, and wherein said first and second rotating steps comprise configuring the pin to extend in a direction substantially perpendicular to the interface, thereby forming a lap joint between the structural members.

8. A method according to claim 1 further comprising providing a first friction stir welding pin before said first rotating step and replacing the first friction stir welding pin with a second friction stir welding pin between said first and second rotating steps, the first and second friction stir welding pins defining dissimilar contours on outer surfaces thereof.

9. A method according to claim 1 wherein said rotating steps comprise urging the pin into the workpiece in substantially opposite directions from opposite sides of the workpiece.

10. A method according to claim 1 further comprising providing the workpiece, the workpiece comprising at least one of the group consisting of aluminum, aluminum alloys, titanium, titanium alloys, and steel.

11. A method of friction stir welding a workpiece, the method comprising:

positioning at least two structural members to form the workpiece defining an interface between the structural members;

rotating a friction stir welding pin, configuring the pin to extend in a direction substantially perpendicular to the interface between the structural members, and urging the friction stir welding pin in a first direction against the workpiece to thereby plasticize a portion of the workpiece and form a first-pass friction stir weld joint therein defining an advancing side and a retreating side; and rotating the friction stir welding pin, configuring the pin to extend in a direction substantially perpendicular to the interface between the structural members, and urging the friction stir welding pin against the workpiece to thereby plasticize a portion of the workpiece and form a second-pass friction stir weld joint therein at least partially substantially parallel to the first-pass friction stir weld joint, the second-pass friction stir weld joint defining an advancing side and a retreating side, wherein the second-pass friction stir weld joint at least partially overlaps the retreating side of the first-pass friction stir weld joint such that the advancing side of the second-pass friction stir weld joint is disposed outside the first-pass friction stir weld joint, and the retreating side of the second-pass friction stir weld joint being substantially entirely disposed within the first-pass friction stir weld joint, the first-pass and second-pass friction stir weld joints thereby forming a multi-pass friction stir weld lap joint between the structural members.

12. A method according to claim 11 wherein said second rotating step comprises overlapping an overlap portion of the first-pass friction stir weld joint with the second-pass friction stir weld joint, the first-pass friction stir weld joint defining a width in a transverse direction extending between the advancing and retreating sides and the overlap portion of the first-pass friction stir weld joint being at least about two-thirds the width of the first-pass friction stir weld joint.

13. A method according to claim 12 wherein said second rotating step comprises overlapping at least about nine-tenths of the width of the first-pass friction stir weld joint.

14. A method according to claim 12 wherein said first and second rotating steps comprise urging the pin into the workpiece in substantially opposite directions from opposite sides of the workpiece.

15. A multi-pass friction stir weld joint disposed in a workpiece including at least one structural member, the friction stir weld joint comprising:

a first-pass friction stir weld joint disposed in the workpiece, the first-pass friction stir weld joint extending longitudinally and defining transversely opposite advancing and retreating sides; and a second-pass friction stir weld joint disposed in the workpiece and defining transversely opposite advancing and retreating sides, the second-pass friction stir weld joint extending substantially parallel to the first-pass friction stir weld joint and only partially overlapping the first-pass friction stir weld joint, the second pass-friction stir weld joint at least partially overlapping the retreating side of the first-pass friction stir weld joint without entirely overlapping the advancing side of the first-pass friction stir weld joint such that the retreating side of the second-pass friction stir weld joint is substantially entirely disposed within the first-pass friction stir weld joint and the advancing side of the second-pass friction stir weld joint is disposed outside the first-pass friction stir weld joint and the first-pass and second-pass friction stir weld joints form the multi-pass friction stir weld joint.

16. A multi-pass friction stir weld joint according to claim 15 wherein the advancing side of the second-pass friction stir weld joint is disposed transversely opposite the first-pass friction stir weld joint such that the retreating side of the second-pass friction stir weld joint at least partially overlaps the first-pass friction stir weld joint.

17. A multi-pass friction stir weld joint according to claim 15 further comprising a third-pass friction stir weld joint disposed in the workpiece and defining transversely opposite advancing and retreating sides, the third-pass friction stir weld joint extending substantially parallel to the first-pass friction stir weld joint and at least partially overlapping the retreating side of the second-pass friction stir weld joint such that the first-pass, second-pass, and third-pass friction stir weld joints form the multi-pass friction stir weld joint.

18. A multi-pass friction stir weld joint according to claim 15 wherein the second-pass friction stir weld joint overlaps an overlap portion of the first-pass friction stir weld joint, the overlap portion being at least about two-thirds of a width of the first-pass friction stir weld joint in a transverse direction extending between the advancing and retreating sides.

19. A multi-pass friction stir weld joint according to claim 15 wherein the second-pass friction stir weld joint overlaps an overlap portion of the first-pass friction stir weld joint, the overlap portion being at least about nine-tenths of a width of the first-pass friction stir weld joint in a transverse direction extending between the advancing and retreating sides.

20. A multi-pass friction stir weld joint according to claim 15 wherein the workpiece includes at least two structural members defining an interface therebetween, the first-pass and second-pass friction stir weld joints extending through the interface to define a lap joint between the structural members.

21. A multi-pass friction stir weld joint according to claim 15 wherein the workpiece comprises at least one of the group consisting of aluminum, aluminum alloys, titanium, titanium alloys, and steel.

22. A method of friction stir welding a workpiece, the method comprising:

providing a first friction stir welding pin defining a contour on the outer surface thereof;

rotating the first friction stir welding pin and urging the first friction stir welding pin in a first direction against the workpiece to thereby plasticize a portion of the workpiece and form a first-pass friction stir weld joint therein defining an advancing side and a retreating side;

providing a second friction stir welding pin defining a contour on the outer surface thereof that is dissimilar to the contour of the first friction stir welding pin; and rotating the second friction stir welding pin and urging the second friction stir welding pin against the workpiece to thereby plasticize a portion of the workpiece and form a second-pass friction stir weld joint therein at least partially substantially parallel to the first-pass friction stir weld joint, the second-pass friction stir weld joint defining an advancing side and a retreating side, wherein the second-pass friction stir weld joint at least partially overlaps the retreating side of the first-pass friction stir weld joint such that the first-pass and second-pass friction stir weld joints form a multi-pass friction stir weld joint, wherein a portion of the second-pass friction stir weld joint is outside the first-pass friction stir weld joint.

23. A method of friction stir welding a workpiece, the method comprising:

rotating a friction stir welding pin in a first rotational direction and urging the friction stir welding pin in a first direction against the workpiece to thereby plasticize a portion of the workpiece and form a first-pass friction stir weld joint therein defining an advancing side and a retreating side; and rotating the friction stir welding pin in the first rotational direction and urging the friction stir welding pin in a second direction opposite the first direction against the workpiece to thereby plasticize a portion of the workpiece and form a second-pass friction stir weld joint therein at least partially substantially parallel to the first-pass friction stir weld joint, the second-pass friction stir weld joint defining an advancing side and a retreating side, wherein the second-pass friction stir weld joint only partially overlaps the first-pass friction stir weld joint, the second-pass friction stir weld joint at least partially overlapping the retreating side of the first-pass friction stir weld joint without entirely overlapping the advancing side of the first-pass friction stir weld joint such that the first-pass and second-pass friction stir weld joints form a multi-pass friction stir weld joint.

24. A method according to claim 23 wherein said second rotating step comprises disposing the retreating side of the second-pass friction stir weld joint substantially entirely within the first-pass friction stir weld joint.

25. A method according to claim 23 further comprising rotating the friction stir welding pin and urging the friction stir welding pin against the workpiece to thereby plasticize a portion of the workpiece and form a third-pass friction stir weld joint therein, the third-pass friction stir weld joint being substantially parallel to the first-pass friction stir weld joint and defining an advancing side and a retreating side, and the third-pass friction stir weld joint at least partially overlapping the retreating side of the second-pass friction stir weld joint such that the first-pass, second-pass, and third-pass friction stir weld joints form the multi-pass friction stir weld joint.

26. A method according to claim 23 wherein said second rotating step comprises overlapping an overlap portion of the first-pass friction stir weld joint with the second-pass friction stir weld joint, the first-pass friction stir weld joint defining a width in a transverse direction extending between the advancing and retreating sides and the overlap portion of the first-pass friction stir weld joint being at least about two-thirds the width of the first-pass friction stir weld joint.

27. A method according to claim 26 wherein said second rotating step comprises overlapping at least about nine-tenths of the width of the first-pass friction stir weld joint.

28. A method according to claim 23 further comprising determining a width of an overlap portion of the of the first-pass friction stir weld joint according to a desired width of the multi-pass friction stir weld joint and a width of the first-pass and second-pass friction stir weld joints and wherein said second rotating step comprises overlapping the overlap portion of the first pass friction stir weld joint with the second-pass friction stir weld joint.

29. A method according to claim 23 further comprising positioning at least two structural members to form the workpiece defining an interface between the structural members, and wherein said first and second rotating steps comprise configuring the pin to extend in a direction substantially perpendicular to the interface, thereby forming a lap joint between the structural members.

30. A method according to claim 23 further comprising providing a first friction stir welding pin before said first rotating step and replacing the first friction stir welding pin with a second friction stir welding pin between said first and second rotating steps, the first and second friction stir welding pins defining dissimilar contours on outer surfaces thereof 31. A method according to claim 23 wherein said rotating steps comprise urging the pin into the workpiece in substantially opposite directions from opposite sides of the workpiece.

32. A method according to claim 23 further comprising providing the workpiece, the workpiece comprising at least one of the group consisting of aluminum, aluminum alloys, titanium, titanium alloys, and steel.

* * * * *